(12) United States Patent
Potokar

(10) Patent No.: US 8,550,208 B1
(45) Date of Patent: *Oct. 8, 2013

(54) HIGH PRESSURE MUFFLING DEVICES

(75) Inventor: Christopher Jon Potokar, Loveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/453,388

(22) Filed: Apr. 23, 2012

(51) Int. Cl.
*F01N 5/04* (2006.01)
*B64D 33/02* (2006.01)
*F01N 5/00* (2006.01)
*B64D 33/00* (2006.01)

(52) U.S. Cl.
USPC ............. 181/212; 181/214; 60/785; 415/119

(58) Field of Classification Search
USPC ........ 181/212, 220, 259, 214; 138/39, 40, 37, 138/41–46; 60/785, 782; 415/119, 144
See application file for complete search history.

(56) References Cited

U.S. PATENT DOCUMENTS

| | | |
|---|---|---|
| 700,785 A | 5/1902 | Kull |
| 759,964 A * | 5/1904 | Bonar ........................... 181/269 |
| 1,473,349 A | 11/1923 | Kach |
| 1,539,595 A | 5/1925 | Powell |
| 1,697,794 A | 1/1929 | Stranahan |
| 1,794,276 A | 2/1931 | Bowes |
| 1,839,192 A * | 1/1932 | Baits ............................ 181/272 |
| 2,701,557 A | 2/1955 | Ramey |
| 2,716,463 A * | 8/1955 | Latulippe ..................... 181/267 |
| 2,919,761 A | 1/1960 | Smith |
| 2,929,248 A | 3/1960 | Sprenkle |
| 3,016,972 A | 1/1962 | Dugas |
| 3,092,206 A | 6/1963 | Rene Moreau |

(Continued)

FOREIGN PATENT DOCUMENTS

| | | |
|---|---|---|
| EP | 2136053 | 12/2009 |
| EP | 2184447 | 5/2010 |
| EP | 2184448 | 5/2010 |

OTHER PUBLICATIONS

Phong et al., "Noise Reduction of a Turbofan Bleed Valve," 50th AIAA Aerospace Sciences Meeting, Nashville, Tennessee, Jan. 9-12, 2012.

(Continued)

*Primary Examiner* — Edgardo San Martin
(74) *Attorney, Agent, or Firm* — General Electric Company; Matthew P. Hayden; William Scott Andes

(57) ABSTRACT

Some example muffling devices may include an inner flow conditioner shaped as a generally conical frustrum and a generally cylindrical an exhaust can around the inner flow conditioner. A ratio of a downstream end wall area of the inner flow conditioner to a downstream end annular area between the downstream end wall and the exhaust can may be about 0.12 to about 0.97. A ratio of the downstream end annular area to the downstream end wall area may be proportional, by a factor of about 0.8 to about 1.9, to a ratio of an effective area of the inner flow conditioner sidewall holes to an effective area of the inner flow conditioner downstream end wall holes. A ratio of a dissipation distance between the inner flow conditioner downstream end wall and the exhaust screen to the inner flow conditioner downstream end wall hole diameter may be greater than about 10.

20 Claims, 4 Drawing Sheets

(56) References Cited

U.S. PATENT DOCUMENTS

| | | | |
|---|---|---|---|
| 3,105,570 A | 10/1963 | Bezemes | |
| 3,120,877 A | 2/1964 | Morris et al. | |
| 3,159,238 A | 12/1964 | Shearer | |
| 3,196,977 A * | 7/1965 | Sanders | 181/256 |
| 3,338,331 A | 8/1967 | Jettinghoff | |
| 3,398,881 A | 8/1968 | Greenberg et al. | |
| 3,493,169 A | 2/1970 | Abild et al. | |
| 3,545,492 A | 12/1970 | Scheid | |
| 3,572,391 A | 3/1971 | Hirsch | |
| 3,632,223 A | 1/1972 | Hampton | |
| 3,635,309 A * | 1/1972 | Nemcansky et al. | 181/267 |
| 3,665,965 A | 5/1972 | Baumann | |
| 3,692,140 A | 9/1972 | Smith | |
| 3,777,489 A | 12/1973 | Johnson et al. | |
| 3,840,051 A | 10/1974 | Akashi et al. | |
| 3,894,610 A * | 7/1975 | Halter et al. | 181/256 |
| 3,945,759 A | 3/1976 | Bobo | |
| 3,951,566 A | 4/1976 | Mattei et al. | |
| 3,964,519 A | 6/1976 | De Baun | |
| 4,022,112 A | 5/1977 | Putt et al. | |
| 4,072,170 A * | 2/1978 | Sagner et al. | 137/599.01 |
| 4,113,050 A | 9/1978 | Smith | |
| 4,128,769 A | 12/1978 | Bons et al. | |
| 4,130,173 A | 12/1978 | Cooksey | |
| 4,132,285 A | 1/1979 | Milde et al. | |
| 4,142,413 A | 3/1979 | Bellinga | |
| 4,156,344 A | 5/1979 | Cuthbertson et al. | |
| 4,177,780 A | 12/1979 | Pellerin | |
| 4,244,440 A | 1/1981 | Matta et al. | |
| 4,244,441 A | 1/1981 | Tolman | |
| 4,375,841 A | 3/1983 | Vielbig | |
| 4,463,552 A | 8/1984 | Monhardt et al. | |
| 3,191,630 A | 6/1985 | Demyan | |
| 4,537,277 A | 8/1985 | Bryce | |
| 4,610,326 A | 9/1986 | Kirchweger et al. | |
| 4,685,533 A | 8/1987 | Piesik | |
| 4,890,691 A | 1/1990 | Ching-ho | |
| 4,979,587 A | 12/1990 | Hirt et al. | |
| 5,205,719 A | 4/1993 | Childs et al. | |
| 5,261,228 A | 11/1993 | Shuba | |
| 5,266,754 A | 11/1993 | Swift | |
| 5,327,941 A | 7/1994 | Bitsakis et al. | |
| 5,428,954 A | 7/1995 | Cowan, Sr. | |
| 5,429,102 A | 7/1995 | Edwards et al. | |
| 5,491,310 A * | 2/1996 | Jen | 181/286 |
| 5,495,872 A | 3/1996 | Gallagher et al. | |
| 5,557,917 A | 9/1996 | Jaw | |
| 5,758,488 A | 6/1998 | Batey | |
| 5,760,348 A * | 6/1998 | Heuser | 181/272 |
| 5,859,393 A * | 1/1999 | Cummins et al. | 181/257 |
| 6,145,544 A | 11/2000 | Dutertre et al. | |
| 6,343,672 B1 * | 2/2002 | Petela et al. | 181/224 |
| 6,415,747 B1 | 7/2002 | Asano et al. | |
| 6,558,137 B2 | 5/2003 | Tomell et al. | |
| 6,565,313 B2 | 5/2003 | Nikkanen et al. | |
| 6,588,195 B2 | 7/2003 | Negulescu | |
| 6,695,094 B2 | 2/2004 | Moffat et al. | |
| 6,776,589 B2 | 8/2004 | Tomell et al. | |
| 6,880,579 B2 | 4/2005 | Boger | |
| 6,968,923 B2 * | 11/2005 | Schmaeman | 181/252 |
| 6,981,842 B2 * | 1/2006 | D'Angelo et al. | 415/144 |
| 7,089,963 B2 | 8/2006 | Meheen | |
| 7,146,961 B1 | 12/2006 | Westcott | |
| 7,210,912 B2 | 5/2007 | Tomell et al. | |
| 7,267,297 B2 | 9/2007 | Campbell et al. | |
| 7,344,107 B2 | 3/2008 | Campbell et al. | |
| 7,364,116 B2 | 4/2008 | Nguyen et al. | |
| 7,367,424 B2 | 5/2008 | Brown et al. | |
| 7,387,188 B2 | 6/2008 | Keller et al. | |
| 7,387,489 B2 * | 6/2008 | Appleby et al. | 415/144 |
| 7,431,125 B2 | 10/2008 | Williams | |
| 7,448,469 B2 | 11/2008 | Seyler et al. | |
| 7,451,855 B2 * | 11/2008 | Wang | 181/286 |
| 7,513,119 B2 | 4/2009 | Zielinski et al. | |
| 7,611,093 B2 | 11/2009 | Campbell et al. | |
| 7,730,995 B2 | 6/2010 | Hunt et al. | |
| 7,762,374 B2 | 7/2010 | Turner et al. | |
| 7,765,784 B2 | 8/2010 | Lwasa et al. | |
| 7,797,945 B2 | 9/2010 | Appleby et al. | |
| 7,798,285 B2 | 9/2010 | Chiou et al. | |
| 7,891,605 B2 | 2/2011 | Nguyen et al. | |
| 7,921,652 B2 * | 4/2011 | Kirby | 60/782 |
| 7,946,104 B2 * | 5/2011 | Frank et al. | 60/226.1 |
| 8,016,071 B1 | 9/2011 | Martinus et al. | |
| 8,128,347 B2 * | 3/2012 | Sokhey | 415/144 |
| 8,307,943 B2 * | 11/2012 | Klasing et al. | 181/210 |
| 8,430,202 B1 * | 4/2013 | Mason et al. | 181/210 |
| 2004/0238123 A1 | 12/2004 | Becknell et al. | |
| 2005/0067218 A1 | 3/2005 | Bristow et al. | |
| 2010/0043447 A1 | 2/2010 | Kirby | |
| 2010/0236256 A1 | 9/2010 | Hussain et al. | |
| 2011/0265490 A1 | 11/2011 | Klasing et al. | |
| 2012/0006615 A1 | 1/2012 | Klasing et al. | |

OTHER PUBLICATIONS

GB Search Report and Opinion issued Oct. 26, 2011, in corresponding Application No. GB1112835.2.

US 7,270,294, 09/2007, Campbell (withdrawn)

* cited by examiner

HIGH PRESSURE MUFFLING DEVICES

BACKGROUND

The subject matter disclosed herein relates generally to muffling systems, and, more specifically, to muffling devices capable of inducing high pressure drops and desirable flow properties.

In a gas turbine engine, air is pressurized in a compression module during operation. The air channeled through the compression module is mixed with fuel in a combustor and ignited, generating hot combustion gases which flow through turbine stages that extract energy therefrom for powering the fan and compressor rotors and generate engine thrust to propel an aircraft in flight or to power a load, such as an electrical generator.

In some gas turbine engines, a portion of the high-pressure air, such as, for example, bleed air from a compressor, may be extracted or bled from the compressor for various needs. These needs include, for example, compressor flow bleeding which may be used in order to improve operability as well as to provide turbine cooling, pressurize bearing sumps, purge air or provide aircraft environment control. The air may be bled off from the compressor using bleed slots located over specific portions or stages of the compressor.

The problem: In least some gas turbine engines, during engine operation occurring in some operating conditions, the compressor may pump more air than is required for needs including the combustion process. In order to manage operability of the engine and combustion performance, a portion of the excess bleed air from the compressor may be routed through bleed conduits and exhausted into the by-pass flow stream, engine exhaust, or to ambient. The pressure and temperature of the air stream bled from the compressor may be very high. For example, bleed air pressure may be greater than about 1375 kPa and the bleed air temperature may be greater than about 538 degrees C. A transient bleed valve system (TBV) system is sometimes used for bleeding and exhausting the air removed from the compressor. Certain conventional designs for bleed exhaust systems use large and/or heavy muffling devices to reduce the generated noise. For example, the exhaust area of some conventional bleed systems may be set to lower the flow velocity at the exhaust location to a level below that required to meet the acoustic limits for the application. The exhaust area, as well as the relatively gently expansions between the source pressure and exhaust, may contribute to the relatively large size and/or weight of these systems. In some applications (e.g., aircraft), it may be undesirable to use large and/or heavy components.

In addition, some conventional exhaust designs on aircraft may require extensive thermal shielding on other components near the exhaust location, once the exhaust velocities that meet the acoustic limits are achieved. Due to the nature of the high temperature air, once it is over-expanded to achieve lower velocities, the air it mixes with may overwhelm the bleed air, causing it to "lay down" on the surrounding structure around the engine. In some aircraft the surrounding structure may be made of lightweight composite material or of other metallic material with lesser temperature capability.

BRIEF DESCRIPTION OF THE INVENTION

At least one solution for the above-mentioned problem(s) is provided by the present disclosure to include example embodiments, provided for illustrative teaching and not meant to be limiting.

An example muffling device according to at least some aspects of the present disclosure may include an inner flow conditioner shaped as a generally conical frustum including an upstream base and a downstream base. A diameter of the upstream base may be larger than a diameter of the downstream base. The inner flow conditioner may include an inlet approximate the upstream base, a generally circular inner flow conditioner downstream end wall having an inner flow conditioner downstream end wall area, the inner flow conditioner downstream end wall being generally orthogonal to a longitudinal axis of the conical frustum and comprising a plurality of generally longitudinally oriented inner flow conditioner downstream end wall holes, and an inner flow conditioner sidewall shaped generally as a truncated cone, the inner flow conditioner sidewall tapering inwardly from approximate the upstream base to approximate the inner flow conditioner downstream wall, the inner flow conditioner sidewall comprising a plurality of generally laterally oriented inner flow conditioner sidewall holes. The muffling device may include an exhaust can disposed substantially around the inner flow conditioner and shaped as a generally circular cylinder. The exhaust can may include a generally annular upstream end wall disposed approximate the upstream base of the inner flow conditioner and substantially circumscribing the upstream base of the inner flow conditioner, a generally circular exhaust screen comprising a plurality of exhaust screen holes, and a generally circular exhaust can sidewall extending from approximate the upstream end wall to approximate the exhaust screen. The inner flow conditioner and the exhaust can may be configured to conduct a fluid inward through the inlet into the inner flow conditioner, through the inner flow conditioner downstream end wall discharge openings and the inner flow conditioner sidewall discharge openings into the exhaust can, and outward through the exhaust screen discharge openings. The exhaust can and the inner flow conditioner downstream end wall may at least partially define a downstream end annular area therebetween. A ratio of the inner flow conditioner downstream end wall area to the downstream end annular area may be about 0.12 to about 0.97.

An example muffling device according to at least some aspects of the present disclosure may include an inner flow conditioner shaped as a generally conical frustum including an upstream base and a downstream base. A diameter of the upstream base may be larger than a diameter of the downstream base. The inner flow conditioner may include an inlet approximate the upstream base, a generally circular inner flow conditioner downstream end wall having an inner flow conditioner downstream end wall area, the inner flow conditioner downstream end wall being generally orthogonal to a longitudinal axis of the conical frustum and comprising a plurality of generally longitudinally oriented inner flow conditioner downstream end wall holes, and an inner flow conditioner sidewall shaped generally as a truncated cone, the inner flow conditioner sidewall tapering inwardly from approximate the upstream base to approximate the inner flow conditioner downstream wall, the inner flow conditioner sidewall comprising a plurality of generally laterally oriented inner flow conditioner sidewall holes. The muffling device may include an exhaust can disposed substantially around the inner flow conditioner and shaped as a generally circular cylinder. The exhaust can may include a generally annular upstream end wall disposed approximate the upstream base of the inner flow conditioner and substantially circumscribing the upstream base of the inner flow conditioner, a generally circular exhaust screen comprising a plurality of exhaust screen holes, and a generally circular exhaust can sidewall extending from approximate the upstream end wall to approximate the exhaust screen. The inner flow conditioner and the exhaust can may be configured to conduct a fluid inward through the inlet into the inner flow conditioner, through the inner flow conditioner downstream end wall discharge openings and the inner flow conditioner sidewall discharge openings into the exhaust can, and outward through the exhaust screen discharge openings. The exhaust can and the inner flow conditioner downstream end wall may at least partially define a downstream end annular area therebetween. A ratio of the downstream end annular area to the downstream end wall area may be proportional, by a factor of about 0.8 to about 1.9, to a ratio of an effective area of the inner flow conditioner sidewall holes to an effective area of the inner flow conditioner downstream end wall holes.

An example muffling device according to at least some aspects of the present disclosure may include an inner flow conditioner shaped as a generally conical frustum including an upstream base and a downstream base. A diameter of the upstream base may be larger than a diameter of the downstream base. The inner flow conditioner may include an inlet approximate the upstream base, a generally circular inner flow conditioner downstream end wall having an inner flow conditioner downstream end wall area, the inner flow conditioner downstream end wall being generally orthogonal to a longitudinal axis of the conical frustum and comprising a plurality of generally longitudinally oriented inner flow conditioner downstream end wall holes, and an inner flow conditioner sidewall shaped generally as a truncated cone, the inner flow conditioner sidewall tapering inwardly from approximate the upstream base to approximate the inner flow conditioner downstream wall, the inner flow conditioner sidewall comprising a plurality of generally laterally oriented inner flow conditioner sidewall holes. The muffling device may include an exhaust can disposed substantially around the inner flow conditioner and shaped as a generally circular cylinder. The exhaust can may include a generally annular upstream end wall disposed approximate the upstream base of the inner flow conditioner and substantially circumscribing the upstream base of the inner flow conditioner, a generally circular exhaust screen comprising a plurality of exhaust screen holes, and a generally circular exhaust can sidewall extending from approximate the upstream end wall to approximate the exhaust screen. The inner flow conditioner and the exhaust can may be configured to conduct a fluid inward through the inlet into the inner flow conditioner, through the inner flow conditioner downstream end wall discharge openings and the inner flow conditioner sidewall discharge openings into the exhaust can, and outward through the exhaust screen discharge openings. The exhaust can and the inner flow conditioner downstream end wall may at least partially define a downstream end annular area therebetween. The inner flow conditioner downstream end wall holes may have an inner flow conditioner downstream end wall hole diameter. The inner flow conditioner downstream end wall may be spaced from the exhaust screen by a dissipation distance. A ratio of the dissipation distance to the inner flow conditioner downstream end wall hole diameter may be greater than about 10.

BRIEF DESCRIPTION OF THE DRAWINGS

The subject matter for which patent claim coverage is sought is particularly pointed out and claimed herein. The subject matter and embodiments thereof, however, may be best understood by reference to the following description taken in conjunction with the accompanying drawing figures in which:

DETAILED DESCRIPTION

Figure 1:
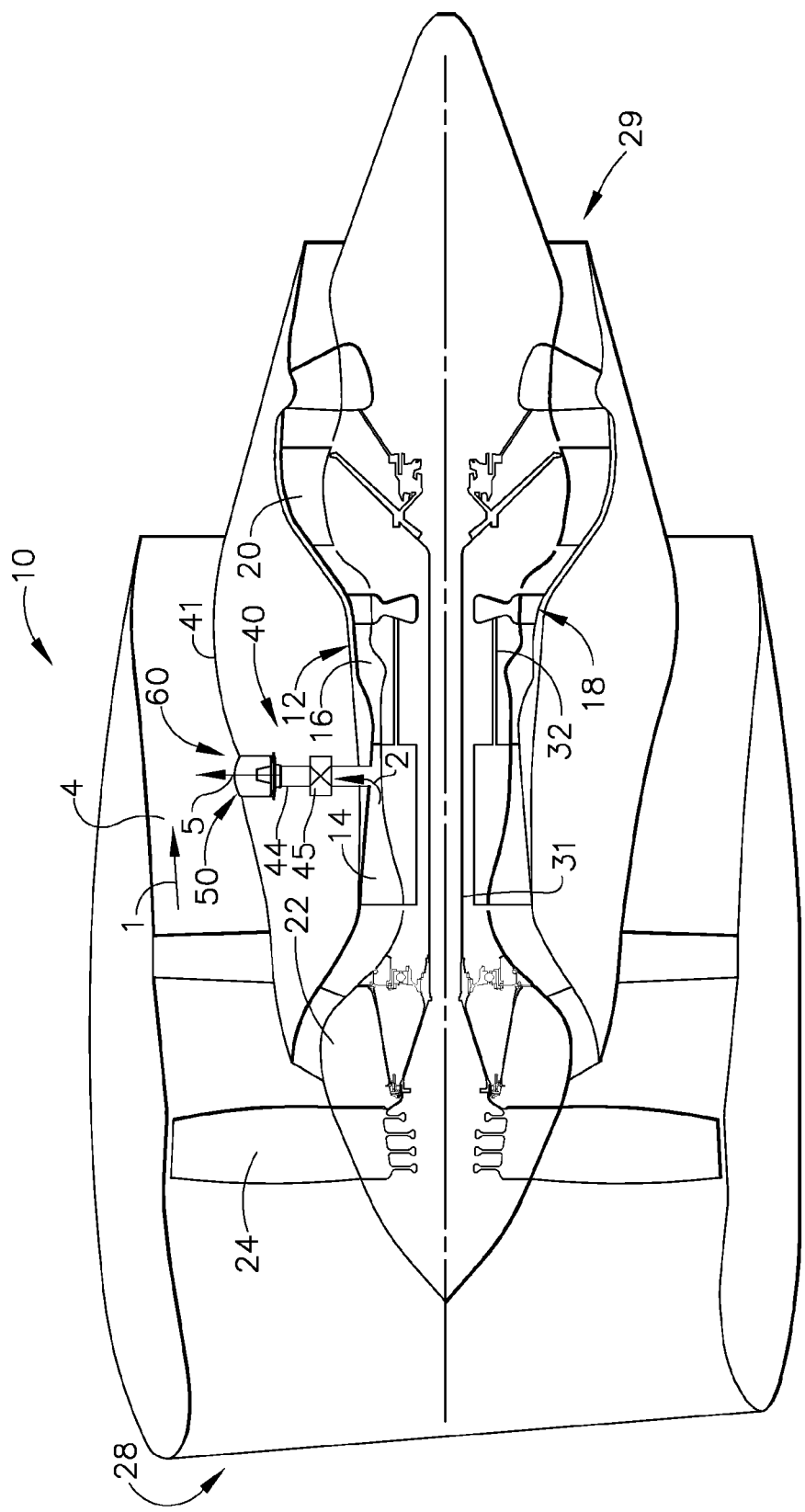
FIG. 1 is a schematic cross-sectional view of an example gas turbine engine assembly including an example bleed system including an example muffling device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure includes, inter alia, muffling systems, and more specifically muffling devices capable of inducing high pressure drops and desirable flow properties.

The present disclosure contemplates that modern, highly efficient turbofan engines may use high-pressure/high-temperature bleed from the aft compressor stages to improve operability and performance. This bleed air may be directed into the fan duct or other locations, which may generate additional noise during some phases of engine operation.

Some example embodiments according to the present disclosure provide a compact, lightweight transient/operability bleed exhaust muffling device (which may be referred to generally as a "pepperpot") that has minimal acoustic impact. Acoustic benefit for the high pressure/temperature compressor discharge bleed may be achieved at a high exhaust velocity into the fan duct and, in some example embodiments, may use only a single flow conditioning element (which may be referred to as an "inner flow conditioner") within the pepperpot body (which may be referred to as an "exhaust can"). Some such embodiments may be referred to as "single stage" muffling devices. The present disclosure contemplates that some "single stage" muffling devices are described in U.S. Provisional Patent Application No. 61/580,675, titled COMPACT HIGH-PRESSURE EXHAUST MUFFLING DEVICES, filed Dec. 28, 2011, and U.S. patent application Ser. No. 13/347,728, titled COMPACT HIGH-PRESSURE EXHAUST MUFFLING DEVICES, filed Jan. 11, 2012, which are incorporated herein by reference. The present disclosure contemplates that some other acoustic pepperpots may utilize multiple (e.g., three to five or more) inner flow conditioning elements, which may add weight to the engine.

In addition, the present disclosure contemplates that some other acoustically friendly pepperpots may necessitate extensive shielding on the thrust reverser structure to address thermal concerns. Some example embodiments according to the present disclosure may reduce or eliminate the need for such shielding by directing at least a substantial portion of the high-temperature bleed air generally to the middle of the cool fan duct flow, which may allow the hot plume to exit the fan duct without substantially impinging on thrust reverser or other aircraft surfaces.

Figure 2:
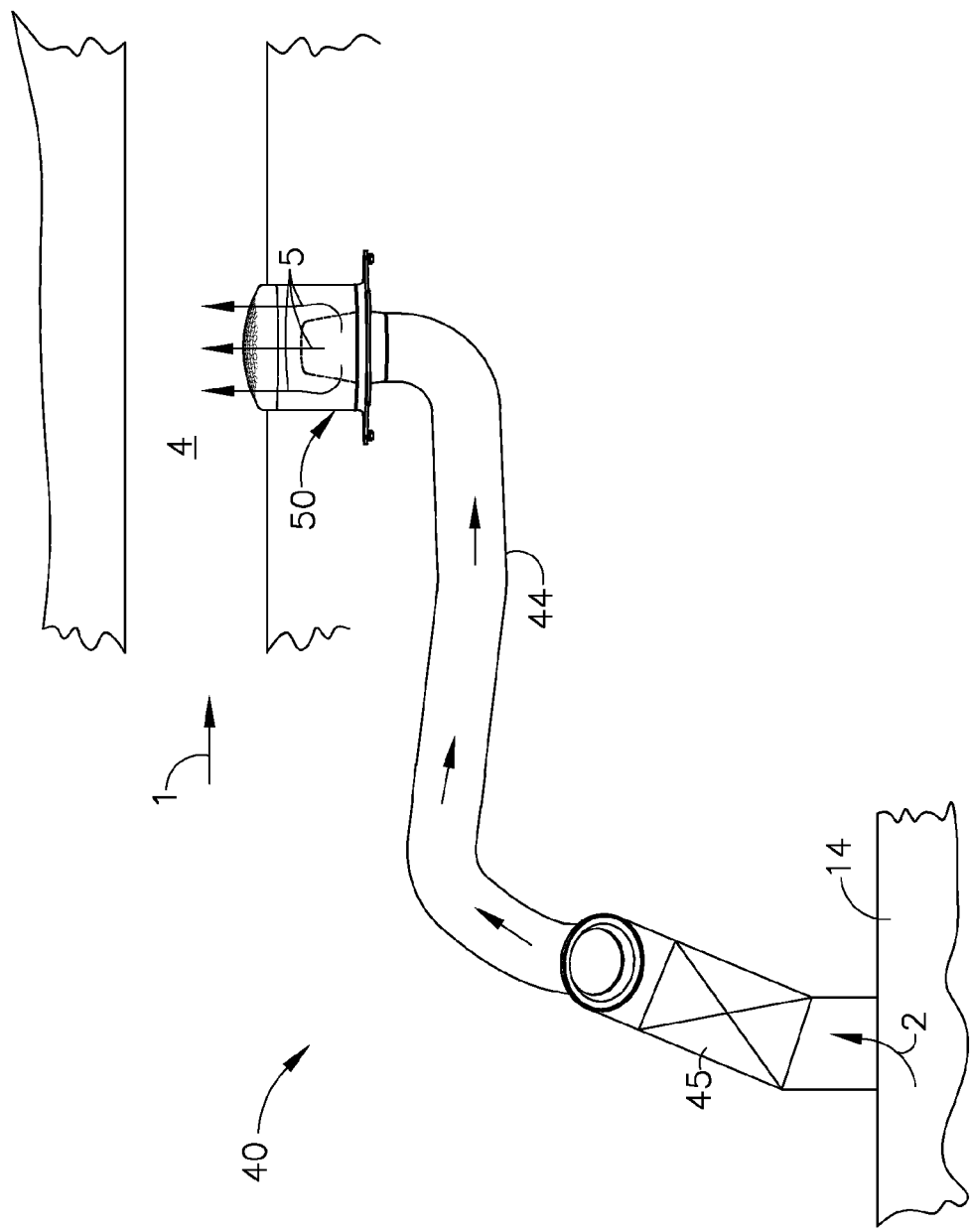
FIG. 2 is a perspective view of an example bleed system including an example muffling device.

FIG. 1 is a schematic cross-sectional view of an example gas turbine engine assembly 10 including an example bleed system 40 including an example muffling device 50, according to at least some aspects of the present disclosure. FIG. 2 is a perspective view of bleed system 40 including muffling device 50, according to at least some aspects of the present disclosure. The gas turbine engine assembly 10 includes a core gas turbine engine 12 that includes a high-pressure compressor 14, a combustor 16, and a high-pressure turbine 18. In the example embodiment shown in FIG. 1, the gas turbine engine assembly 10 also includes a low-pressure turbine 20 coupled axially downstream from core gas turbine engine 12 and a fan assembly 22 coupled axially upstream from core gas turbine engine 12. Fan assembly 22 includes an array of fan blades 24 that extend radially outward from a rotor disk. In the exemplary embodiment shown in FIG. 1, gas turbine engine assembly 10 has an intake side 28 and an exhaust side 29. Core gas turbine engine 12, fan assembly 22, and low-pressure turbine 20 are coupled together by a first rotor shaft 31, and high-pressure compressor 14 and high-pressure turbine 18 are coupled together by a second rotor shaft 32.

In operation, air flows through fan blades 24 and is supplied to high-pressure compressor 14. The air discharged from fan assembly 22 is channeled to high-pressure compressor 14 where the airflow is further compressed and channeled to combustor 16. Products of combustion from combustor 16 are utilized to drive high-pressure turbine 18 and low-pressure turbine 20, and turbine 20 drives fan assembly 22 via shaft 31.

In an example gas turbine engine assembly 10, at certain operating conditions, a portion of the compressed air may be routed through the bleed system 40, thereby becoming bleed air 2. Bleed air 2 from high-pressure compressor 14 may enter a bleed flow conduit 44. Bleed air 2 may pass through the bleed flow conduit 44 and enter muffling device 50 that directs bleed air 2 into a flow path, such as the bypass flow path 4 and mixes that air with another flow, such as a fan flow stream 1. Flow through bleed flow conduit 44 may be controlled by a bleed air valve 45. Bleed flow conduit 44 may be made from a variety of materials, such as a metal, which may be selected to be capable of withstanding a bleed air 2 flow that is relatively hot and at high pressure.

Muffling device 50, described in more detail herein below, may be in flow communication with bleed flow conduit 44 such that the bleed air 2 is discharged as exit flow stream 5 into by-pass flow path 4, facilitating a reduction of the noise generated by the mixing of the exit flow stream 5 and fan flow stream 1.

As shown in FIG. 2, bleed flow conduit 44 may convey bleed air 2 from bleed air valve 45 to muffling device 50. In some example embodiments according to at least some aspects of the present disclosure, some or all of the acoustic improvements provided by this device occur within muffling device 50, which may allow the use of relatively small diameter and lightweight ducting to direct the flow to a location very close to the exhaust can.

Figure 3:
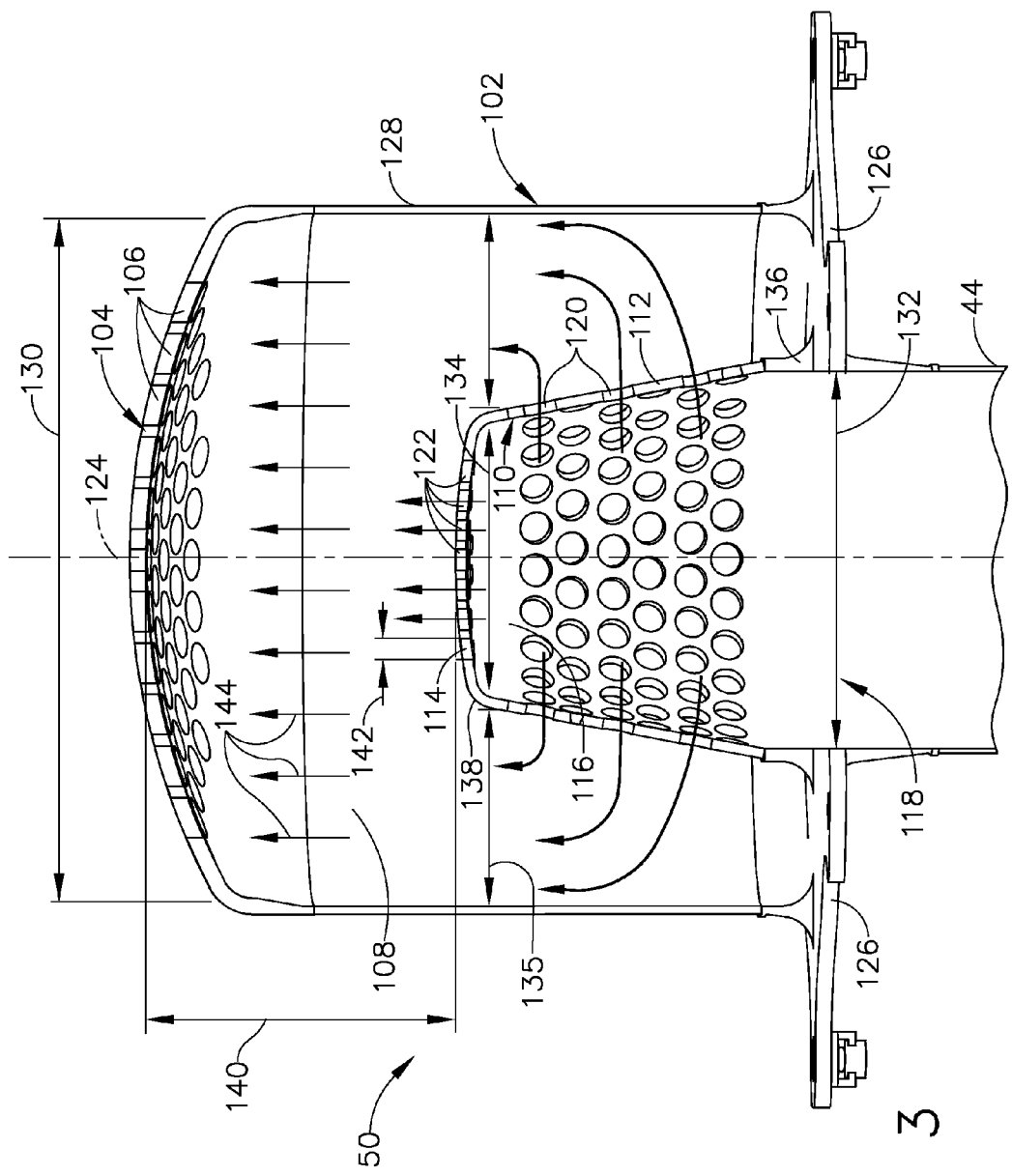
FIG. 3 is a cross-sectional view of an example muffling device.
Figure 4:
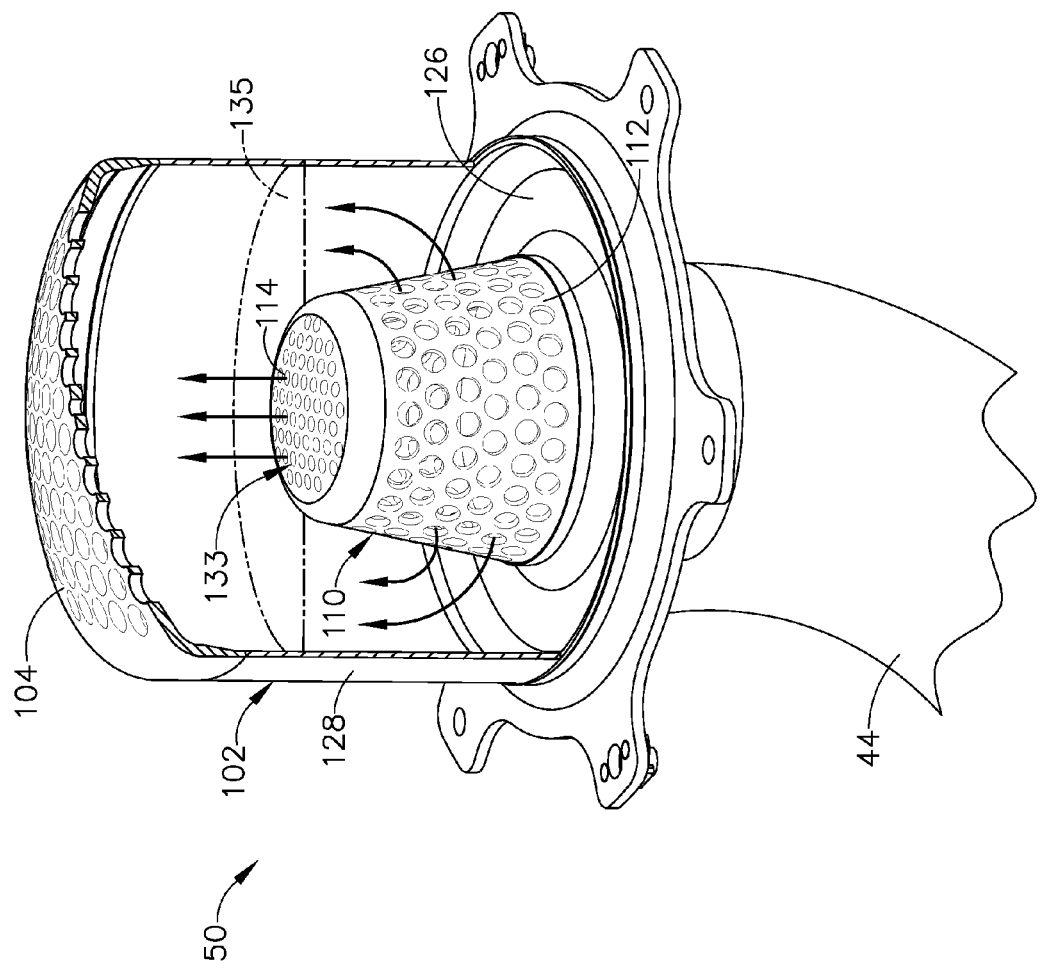
FIG. 4 is a partial-cutaway, perspective view of an example muffling device, all in accordance with at least some aspects of the present disclosure.

FIG. 3 is a cross-sectional view of an example muffling device 50, according to at least some aspects of the present disclosure. FIG. 4 is a partial-cutaway, perspective view of an example muffling device 50, according to at least some aspects of the present disclosure. Muffling device 50 may comprise an exhaust can 102, which may include an exhaust screen 104 (which may be generally circular) at a downstream end, an upstream end wall 126 (which may be generally annular), and a sidewall 128 (which may be generally circular). Exhaust can 102 may be generally in the form of a hollow circular cylinder arranged about a central axis 124 with a diameter 130. Exhaust screen 104 may include a plurality of holes 106 through which air may be discharged from an interior 108 of exhaust can 102. In some example embodiments, exhaust screen 104 may be outwardly curved.

In some example embodiments according to at least some aspects of the present disclosure, an inner flow conditioner 110 may be disposed within exhaust can 102. Inner flow conditioner 110 may be generally in the form of a hollow, conical frustum arranged coaxially with exhaust can 102 about central axis 124. Inner flow conditioner 110 may include an inwardly tapering sidewall 112 and a downstream end wall 114, which may be generally circular. Sidewall 112 may be shaped generally as a truncated cone. Downstream end wall 114 may be generally orthogonal to central axis 124. Inner flow conditioner 110 may taper inwardly from an upstream base 136 (which may be substantially circumscribed by upstream end wall 126) to a downstream base 138 (which may be proximate downstream end wall 114). Sidewall 112 and downstream end wall 114 may at least partially define an interior 116 of inner flow conditioner 110. Sidewall 112 may include a plurality of generally laterally oriented holes 120 and/or downstream end wall 114 may include a plurality of generally axially oriented holes 122 through which pressurized air may be discharged into interior 108 of exhaust can 102. Inner flow conditioner 110 may be arranged to receive pressurized air from bleed flow conduit 44 through an inlet 118 (which may be proximate upstream base 136). Inner flow conditioner 110 may have an upstream base diameter 132 proximate inlet 118 and/or downstream base diameter 134 proximate downstream end wall 114. Upstream base diameter 132 may be larger than downstream base diameter 134. Inner flow conditioner 110 may be attached inside exhaust can 102 such that inlet 118 is disposed within upstream end wall 126 of exhaust can 102.

Downstream base 138 may at least partially define a downstream end wall area 133, which may be the generally axially downstream facing area of downstream end wall 114. Downstream base 138 and exhaust can 102 may at least partially define a downstream end annular area 135, which may be the generally axially downstream facing area between downstream end wall 114 and sidewall 128 of exhaust can 102. In some example embodiments, a ratio of downstream end wall area 133 to downstream end annular area 135 may be about 0.12 to about 0.97. In some example embodiments, a ratio of downstream end wall area 133 to downstream end annular area 135 may be about 0.16 to about 0.28. In some example embodiments, a ratio of downstream end wall area 133 to downstream end annular area 135 may be about 0.17 to about 0.20.

In operation, inner flow conditioner 110 and exhaust screen 102 may be configured to conduct pressurized air inward through inlet 118 into interior 116 of inner flow conditioner 110, through holes 120 and/or holes 122 of inner flow conditioner 110 into interior 108 of exhaust can 102, and outward through holes 106 of exhaust screen 104. In some example embodiments, interior 108 of exhaust can 102 may be substantially devoid of flow obstructions between holes 120 and holes 122 of inner flow conditioner and holes 106 of exhaust screen 104.

An example muffling device 50 may include holes 106, 120, 122 having individual hole sizes (e.g., diameters and/or slot length/width) and areas. An individual hole may have an effective area for fluid flow that differs from its measurable physical area. A hole's effective area for fluid flow may be determined by known methods, and may depend on the size and shape of the hole. A plurality of holes, e.g., holes 106 of exhaust screen 104, may have an effective area for fluid flow that may be calculated using known methods. For example, holes 120 of sidewall 112 of inner flow conditioner 110 may have an effective flow area and/or holes 122 of downstream end wall 114 of inner flow conditioner 110 may have an effective flow area.

In some example embodiments according to at least some aspects of the present disclosure, a ratio of downstream end annular area 135 to downstream end wall area 133 may be proportional, by a factor of about 0.8 to about 1.9, to a ratio of the effective area of holes 120 of sidewall 112 of inner flow conditioner 110 to the effective flow area of holes 122 of downstream end wall 114 of inner flow conditioner 110. Expressed mathematically, $$\frac{\text{downstream end annular area 135}}{\text{downstream end wall area 133}} = F * \frac{\text{effective flow area of holes 120}}{\text{effective flow area of holes 122}}$$

where F, in some example embodiments, may be about 0.8 to about 1.9. In some example embodiments, F may be about 0.88 to about 1.58. In some example embodiments, F may be about 0.97 to about 1.26.

In some example embodiments according to at least some aspects of the present disclosure, a ratio of an effective flow area of the holes (e.g., holes 120 and holes 122) of an inner flow conditioner (e.g., inner flow conditioner 110) to an effective flow area of an inlet (e.g., inlet 118) may be about 0.7 to about 1.2. In some example embodiments according to at least some aspects of the present disclosure, a ratio of an effective flow area of the holes of the inner flow conditioner to an effective flow area of the inlet may be about 0.76 to about 0.91.

In some example embodiments according to at least some aspects of the present disclosure, inner flow conditioner 110 may be disposed within an exhaust can 102 such that airflow through holes 122 of downstream end wall 114 substantially dissipates before it reaches exhaust screen 104 of exhaust can 102. For example, downstream end wall 114 may be spaced from exhaust screen 104 by a dissipation distance 140. One or more holes 122 through downstream end wall 114 may have a hole diameter 142. In some example embodiments, a ratio of dissipation distance 140 to hole diameter 142 may be greater than 10. In some example embodiments, the ratio of dissipation distance 140 to hole diameter 142 may be greater than 15. In some example embodiments, the ratio of dissipation distance 140 to hole diameter 142 may be greater than 20.

Some example embodiments according to at least some aspects of the present disclosure may be arranged such that air flow 144 approaching exhaust screen 104 may be substantially uniform across diameter 130 of exhaust can 102.

Although some example embodiments have been described in connection with discharging exit flow stream 5 into by-pass flow path 4, it is within the scope of the disclosure to direct exit flow stream 5 elsewhere. For example, some muffling devices according to the present disclosure may be mounted at the engine pylon, the turbine rear frame, and/or core nozzle/center bleed tube. Some example embodiments may be arranged to direct exit flow stream 5 generally behind gas turbine engine assembly 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A muffling device, comprising:
   an inner flow conditioner shaped as a generally conical frustum comprising an upstream base and a downstream base, a diameter of the upstream base being larger than a diameter of the downstream base, the inner flow conditioner comprising
      an inlet approximate the upstream base,
      a generally circular inner flow conditioner downstream end wall having an inner flow conditioner downstream end wall area, the inner flow conditioner downstream end wall being generally orthogonal to a longitudinal axis of the conical frustum and comprising a plurality of generally longitudinally oriented inner flow conditioner downstream end wall holes, and
      an inner flow conditioner sidewall shaped generally as a truncated cone, the inner flow conditioner sidewall tapering inwardly from approximate the upstream base to approximate the inner flow conditioner downstream wall, the inner flow conditioner sidewall comprising a plurality of generally laterally oriented inner flow conditioner sidewall holes; and
   an exhaust can disposed substantially around the inner flow conditioner and shaped as a generally circular cylinder, the exhaust can comprising
      a generally annular upstream end wall disposed approximate the upstream base of the inner flow conditioner and substantially circumscribing the upstream base of the inner flow conditioner,
      a generally circular exhaust screen comprising a plurality of exhaust screen holes, and
      a generally circular exhaust can sidewall extending from approximate the upstream end wall to approximate the exhaust screen;
   wherein the inner flow conditioner and the exhaust can are configured to conduct a fluid inward through the inlet into the inner flow conditioner, through the inner flow conditioner downstream end wall discharge openings and the inner flow conditioner sidewall discharge openings into the exhaust can, and outward through the exhaust screen discharge openings;
   wherein the exhaust can and the inner flow conditioner downstream end wall at least partially define a downstream end annular area therebetween; and
   wherein a ratio of the inner flow conditioner downstream end wall area to the downstream end annular area is about 0.12 to about 0.97.

2. The muffling device of claim 1, wherein the ratio of the inner flow conditioner downstream end wall area to the downstream end annular area is about 0.16 to about 0.28.

3. The muffling device of claim 1, wherein the ratio of the inner flow conditioner downstream end wall area to the downstream end annular area is about 0.17 to about 0.20.

4. The muffling device of claim 1, wherein a ratio of the downstream end annular area to the downstream end wall area is proportional, by a factor of about 0.8 to about 1.9, to a ratio of an effective area of the inner flow conditioner sidewall holes to an effective area of the inner flow conditioner downstream end wall holes.

5. The muffling device of claim 1, wherein a ratio of the downstream end annular area to the downstream end wall area is proportional, by a factor of about 0.97 to about 1.26, to a ratio of an effective area of the inner flow conditioner sidewall holes to an effective area of the inner flow conditioner downstream end wall holes.

6. The muffling device of claim 1,
wherein the inner flow conditioner downstream end wall holes have an inner flow conditioner downstream end wall hole diameter;
wherein the inner flow conditioner downstream end wall is spaced from the exhaust screen by a dissipation distance; and
wherein a ratio of the dissipation distance to the inner flow conditioner downstream end wall hole diameter is greater than about 10.

7. The muffling device of claim 1,
wherein the inner flow conditioner downstream end wall holes have an inner flow conditioner downstream end wall hole diameter;
wherein the inner flow conditioner downstream end wall is spaced from the exhaust screen by a dissipation distance; and
wherein a ratio of the dissipation distance to the inner flow conditioner downstream end wall hole diameter is greater than about 20.

8. A muffling device, comprising:
an inner flow conditioner shaped as a generally conical frustum comprising an upstream base and a downstream base, a diameter of the upstream base being larger than a diameter of the downstream base, the inner flow conditioner comprising
an inlet approximate the upstream base,
a generally circular inner flow conditioner downstream end wall having an inner flow conditioner downstream end wall area, the inner flow conditioner downstream end wall being generally orthogonal to a longitudinal axis of the conical frustum and comprising a plurality of generally longitudinally oriented inner flow conditioner downstream end wall holes, and
an inner flow conditioner sidewall shaped generally as a truncated cone, the inner flow conditioner sidewall tapering inwardly from approximate the upstream base to approximate the inner flow conditioner downstream wall, the inner flow conditioner sidewall comprising a plurality of generally laterally oriented inner flow conditioner sidewall holes; and
an exhaust can disposed substantially around the inner flow conditioner and shaped as a generally circular cylinder, the exhaust can comprising
a generally annular upstream end wall disposed approximate the upstream base of the inner flow conditioner and substantially circumscribing the upstream base of the inner flow conditioner,
a generally circular exhaust screen comprising a plurality of exhaust screen holes, and
a generally circular exhaust can sidewall extending from approximate the upstream end wall to approximate the exhaust screen;
wherein the inner flow conditioner and the exhaust can are configured to conduct a fluid inward through the inlet into the inner flow conditioner, through the inner flow conditioner downstream end wall discharge openings and the inner flow conditioner sidewall discharge openings into the exhaust can, and outward through the exhaust screen discharge openings;
wherein the exhaust can and the inner flow conditioner downstream end wall at least partially define a downstream end annular area therebetween; and
wherein a ratio of the downstream end annular area to the downstream end wall area is proportional, by a factor of about 0.8 to about 1.9, to a ratio of an effective area of the inner flow conditioner sidewall holes to an effective area of the inner flow conditioner downstream end wall holes.

9. The muffling device of claim 8, wherein the ratio of the downstream end annular area to the downstream end wall area is proportional, by a factor of about 0.88 to about 1.58, to the ratio of the effective area of the inner flow conditioner sidewall holes to the effective area of the inner flow conditioner downstream end wall holes.

10. The muffling device of claim 8, wherein the ratio of the downstream end annular area to the downstream end wall area is proportional, by a factor of about 0.97 to about 1.26, to the ratio of the effective area of the inner flow conditioner sidewall holes to the effective area of the inner flow conditioner downstream end wall holes.

11. The muffling device of claim 8, wherein a ratio of the inner flow conditioner downstream end wall area to the downstream end annular area is about 0.17 to about 0.20.

12. The muffling device of claim 8,
wherein the inner flow conditioner downstream end wall holes have an inner flow conditioner downstream end wall hole diameter;
wherein the inner flow conditioner downstream end wall is spaced from the exhaust screen by a dissipation distance; and
wherein a ratio of the dissipation distance to the inner flow conditioner downstream end wall hole diameter is greater than about 10.

13. The muffling device of claim 8,
wherein the inner flow conditioner downstream end wall holes have an inner flow conditioner downstream end wall hole diameter;
wherein the inner flow conditioner downstream end wall is spaced from the exhaust screen by a dissipation distance; and
wherein a ratio of the dissipation distance to the inner flow conditioner downstream end wall hole diameter is greater than about 20.

14. A muffling device, comprising:
an inner flow conditioner shaped as a generally conical frustum comprising an upstream base and a downstream base, a diameter of the upstream base being larger than a diameter of the downstream base, the inner flow conditioner comprising
an inlet approximate the upstream base,
a generally circular inner flow conditioner downstream end wall having an inner flow conditioner downstream end wall area, the inner flow conditioner downstream end wall being generally orthogonal to a longitudinal axis of the conical frustum and comprising a plurality of generally longitudinally oriented inner flow conditioner downstream end wall holes, and
an inner flow conditioner sidewall shaped generally as a truncated cone, the inner flow conditioner sidewall tapering inwardly from approximate the upstream base to approximate the inner flow conditioner downstream wall, the inner flow conditioner sidewall comprising a plurality of generally laterally oriented inner flow conditioner sidewall holes; and an exhaust can disposed substantially around the inner flow conditioner and shaped as a generally circular cylinder, the exhaust can comprising
  a generally annular upstream end wall disposed approximate the upstream base of the inner flow conditioner and substantially circumscribing the upstream base of the inner flow conditioner,
  a generally circular exhaust screen comprising a plurality of exhaust screen holes, and
  a generally circular exhaust can sidewall extending from approximate the upstream end wall to approximate the exhaust screen;
wherein the inner flow conditioner and the exhaust can are configured to conduct a fluid inward through the inlet into the inner flow conditioner, through the inner flow conditioner downstream end wall discharge openings and the inner flow conditioner sidewall discharge openings into the exhaust can, and outward through the exhaust screen discharge openings;
wherein the exhaust can and the inner flow conditioner downstream end wall at least partially define a downstream end annular area therebetween;
wherein the inner flow conditioner downstream end wall holes have an inner flow conditioner downstream end wall hole diameter;
wherein the inner flow conditioner downstream end wall is spaced from the exhaust screen by a dissipation distance; and
wherein a ratio of the dissipation distance to the inner flow conditioner downstream end wall hole diameter is greater than about 10.

15. The muffling device of claim 14, wherein a ratio of the dissipation distance to the inner flow conditioner downstream end wall hole diameter is greater than about 15.

16. The muffling device of claim 14, wherein a ratio of the dissipation distance to the inner flow conditioner downstream end wall hole diameter is greater than about 20.

17. The muffling device of claim 14, wherein a ratio of the inner flow conditioner downstream end wall area to the downstream end annular area is about 0.16 to about 0.28.

18. The muffling device of claim 14, wherein a ratio of the inner flow conditioner downstream end wall area to the downstream end annular area is about 0.17 to about 0.20.

19. The muffling device of claim 14, wherein a ratio of the downstream end annular area to the downstream end wall area is proportional, by a factor of about 0.88 to about 1.58, to a ratio of an effective area of the inner flow conditioner sidewall holes to an effective area of the inner flow conditioner downstream end wall holes.

20. The muffling device of claim 14, wherein a ratio of the downstream end annular area to the downstream end wall area is proportional, by a factor of about 0.97 to about 1.26, to a ratio of an effective area of the inner flow conditioner sidewall holes to an effective area of the inner flow conditioner downstream end wall holes.

* * * * *

UNITED STATES PATENT AND TRADEMARK OFFICE
CERTIFICATE OF CORRECTION

Page 1 of 1

| | |
|---|---|
| PATENT NO. | : 8,550,208 B1 |
| APPLICATION NO. | : 13/453388 |
| DATED | : October 8, 2013 |
| INVENTOR(S) | : Potokar |

It is certified that error appears in the above-identified patent and that said Letters Patent is hereby corrected as shown below:

On the Title Page, Item (57), under "ABSTRACT", in Column 2, Line 2, delete "frustrum" and insert -- frustum --, therefor.

On Title Page 2, Item (56), under "U.S. PATENT DOCUMENTS", in Column 1, Line 33, delete "6/1985" and insert -- 6/1965 --, therefor.

In the Specification

In Column 6, Lines 53-54, delete "exhaust screen 102" and insert -- exhaust screen 104 --, therefor.

Signed and Sealed this
Eighteenth Day of March, 2014

Michelle K. Lee
*Deputy Director of the United States Patent and Trademark Office*